United States Patent [19]

White et al.

[11] Patent Number: 4,837,243

[45] Date of Patent: Jun. 6, 1989

[54] FOAMABLE MOLDING COMPOSITIONS

[75] Inventors: Roger J. White; Sivaram Krishnan, both of Pittsburgh, Pa.

[73] Assignee: Mobay Corporation, Pittsburgh, Pa.

[21] Appl. No.: 271,810

[22] Filed: Nov. 15, 1988

[51] Int. Cl.$^4$ .................................................. C08J 9/06
[52] U.S. Cl. ....................................... 521/94; 521/138; 521/139; 521/140; 521/180; 521/182
[58] Field of Search ................. 521/94, 138, 139, 180, 521/182, 140

[56] References Cited

U.S. PATENT DOCUMENTS

| | | | |
|---|---|---|---|
| 3,888,801 | 6/1975 | Hunter et al. | 260/2.5 |
| 4,207,402 | 6/1980 | Sprenkle | 521/139 |
| 4,420,584 | 12/1983 | Rawlings et al. | 524/502 |
| 4,737,523 | 4/1988 | White et al. | 521/91 |
| 4,751,250 | 6/1988 | White et al. | 521/94 |

Primary Examiner—Morton Foelak
Attorney, Agent, or Firm—Gene Harsh; Joseph C. Gil; Aron Preis

[57] ABSTRACT

A Chemical Blowing Agent (CBA) concentrate was developed comprising a modifying agent and a chemical blowing agent. The CBA is characterized in that its decomposition products contain a primary amine. The modifying agent is a blend of a maleic anhydride copolymer and a butadiene based rubber. It was surprisingly found that resin degradation which often accompanies foam moldings using a CBA of the present type and is expressed in terms of a reduction in the molecular weight of the resin, is much reduced upon the incorporation of the modifying agent and chemical blowing agent of the invention. The concentrate may optionally further comprise a polymeric resin component.

8 Claims, No Drawings

FOAMABLE MOLDING COMPOSITIONS

FIELD OF THE INVENTION

The present invention relates to thermoplastic molding materials and in particular to foamable molding compositions.

SUMMARY OF THE INVENTION

A Chemical Blowing Agent (CBA) concentrate was developed comprising a modifying agent and a chemical blowing agent. The CBA is characterized in that its decomposition products contain a primary amine. The modifying agent is a blend of a maleic anhydride copolymer and a butadiene based rubber. It was surprisingly found that resin degradation which often accompanies foam moldings using a CBA of the present type and is expressed in terms of a reduction in the molecular weight of the resin, is much reduced upon the incorporation of the modifying agent and chemical blowing agent of the invention. The concentrate may optionally further comprise a polymeric resin component.

BACKGROUND OF THE INVENTION

Foamable molding compositions containing chemical blowing agents are known. U.S. Pat. No. 3,888,801 discloses the chemical blowing agents which are suitable in the context of the present invention. Resins which are suitable in the present invention are also disclosed in that patent.

Polycarbonate compositions having an improved level of impact strength comprising an aromatic polycarbonate, glass fibers and a polyanhydride have been disclosed in U.S. Pat. No. 4,420,584. In U.S. Pat. No. 4,207,402, there was disclosed foamable composition comprising an addition polymer in combination with an interpolymer of an alkyl aromatic monomer and maleic anhydride and a particular foaming agent. The advantages were said to be associated with the attainment of shorter molding cycles.

The art is also noted to include U.S. Pat. No. 4,737,523 which disclosed a foamable molding composition containing a thermoplastic resin, a polyanhydride compound which contains at least one cyclic anhydride in its structure, a blowing agent and a nucleating agent. In U.S. Pat. No. 4,751,250 there was disclosed a process for producing a foamed article containing a chemical blowing agent and entailing the use of an anhydride. The chemical blowing agent disclosed in the later two patents is identical to the one entailed in the present invention.

DETAILED DESCRIPTION OF THE INVENTION

The modifying agent of the invention comprises a blend of (i) an anhydride and (ii) a rubber.

The anhydride of the invention is a compound containing at least one cyclic anhydride. Preferably the anhydride is a polymeric compound containing at least one cyclic anhydride, preferably maleic acid anhydride, in its repeating unit; most preferably the anhydride is a copolymer of maleic acid anhydride and at least one olefin. Examples of suitable olefins are styrene, vinyl ether and methyl vinyl ether. Preferably, the anhydride conforms to

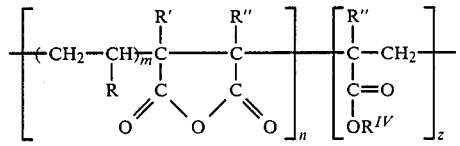

wherein
R is a hydrogen atom or a substituted or an unsubstituted radical selected from the group consisting of $C_6-C_{12}$ phenyl, $C_1-C_{12}$ alkoxy and $C_1-C_{28}$ alkyl radicals,
n is an integer of from 1 to about 200,
m is about 1 to 5, z is 0 to 5 and
R' and R'' independently are a hydrogen or a halogen atom or a $C_1-C_3$ alkyl radical, R''' is a hydrogen atom or a $C_1-C_4$ alkyl and a $R^{IV}$ is either a linear or a branched $C_1-C_{30}$ alkyl or arylalkyl radical.
In one preferred embodiment is about 145 and m is 1

The preparation of suitable anhydride conforming to the above, namely a copolymer of maleic anhydride and an -olefin is described in U.S. Pat. No. 3,586,659 hereby incorporated by reference. Examples of olefin compounds suitable for forming the anhydride of the composition include: Ethylene; 1-propene; 1decene; 1-butene; 1-undecene; 1-isobutylene; 1hexene; 1-dodecene; 1-pentene; 1-tridecene; 1-heptene; 1-octene; 1-tetradecene; 1-octadecene; 1nonadecene; styrene; 1-nonene and mixtures thereof. The copolymerization procedure may involve contacting the olefinic compound with the maleic anhydride in a suitable solvent in the presence of a catalyst. The molar ratio of the mono- -olefin to maleic anhydride is desirably between about 1:1 and 8:1. Other suitable anhydrides include terpolymers of styrene, malic anhydride and an acrylate or methacrylate such as methyl methacrylate.

The rubber of the modifying agent is a butadiene rubber and more preferably an ABS resin. ABS resins (acrylonitrile-butadiene-styrene) resins are well known in the art. Examples of suitable ABS resins have been disclosed in ABS Plastics by C. H. Basdekis, Reinhold Publishing Corp., New York, N.Y. which is incorporated herein by reference.

The optional polymeric resin component of the composition of the invention is a thermoplastic resin which is both suitable for foaming, i.e. foamable, and is sensitive to the foaming agent's decomposition products which contain primary amines, for instance, an amino urazole. Sensitivity in the present context is considered to be a tendency towards structural degradation, expressed for instance, as a reduction in molecular weight resulting upon exposing the resins to the decomposition products at the molding temperature of the resin. Among the sensitive resins, mention may be made of polycarbonates, polyalkylene terephthalates, aromatic polyesters and polyester-carbonates. The preferred resins are polycarbonates and polyalkylene terephthalates.

In the present context, polycarbonate resins have a molecular weight (weight average) of about 10,000 to about 200,000, preferably about 20,000 to about 80,000, which may alternatively be characterized as having a melt flow rate per ASTM D-1238 at 300° C, of about 1 to about 60 gm/10 minutes, preferably about 2-6 gm/10 minutes. Polycarbonates which are suitable for the preparation of the preferred compositions of the invention are available in commerce — for instance under the tradename Makrolon, from Mobay Corporation. The preparation of polycarbonate resins, preferably by interfacial condensation of certain dihydroxy compounds with phosgene has been well documented — see, for instance, the manuscript Chemistry and Physics of Polycarbonates, by Herman Schnell, IPnterscience Publishers, 1964, which is incorporated by reference herein.

Dihydroxy compounds suitable for the preparation of the polycarbonates of the invention conform to the structural formulae (1) or (2)

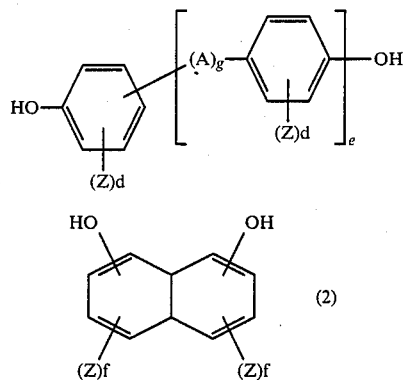

wherein
A denotes an alkylene group with 1 to 8 carbon atoms, an alkylidene group with 2 to 8 carbon atoms a cycloalkylene group with 5 to 15 carbon atoms, a cycloalkylidene group with 5 to 15 carbon atoms, a carbonyl group, an oxygen atom, an —SO— or —SO$_2$— radical; or a radical of the general formula

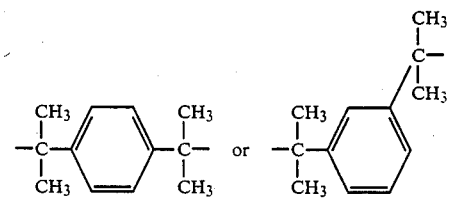

g denotes 0 or 1;
e denotes 0 or 1; z denotes F, Cl, Br or a C$_1$-C$_2$ alkyl and if several Z radicals are substituents in one aryl radical, they may be identical or different one from the other;
d denotes 0 to 4; and
f denotes 0 to 3.

Among the useful dihydroxy compounds in the practice of the invention are hydroquinone, resorcinol, bis-(hydroxyphenyl)-alkanes, bis-(hydroxyphenyl)-cycloalkanes, bis-(hydroxphenyl)-ethers, bis-(hydroxyphenyl)-ketones, bis-(hydroxyphenyl)-sulfoxides, bis-(hydroxyphenyl)-sulfide, bis-(hydroxyphenyl)-sulfones and α, α-bis-(hydroxyphenyl)-diisopropyl-benzenes. These and further suitable aromatic dihydroxy compounds are described, for example, in U.S. Pat. Nos. 3,028,365; 2,998,835; 3,148,172; 3,271,368; 2,991,273; 3,271,367; 3,280,078; 3,014,891; and 2,999,846 (all incorporated herein by reference), in German Offenlegungsschriften (Germen Published Specifications) Nos. 1,570,703; 2,063,050; 2,063,052; 2,211,956 and 2,211,957, in French Patent Specification No. 1,561,518 and in the monograph, H. Schnell, Chemistry and Physics of Polycarbonates, Interscience Publishers, New York, 1964. Further examples of suitable bisphenols are 2,2-bis-(hydroxphenyl)-propane (bisphenol A), 2,2-bis-(4-hydroxyphenyl)--2-methylbutane, 1,1-bis-(4-hydroxyphenyl) -cyclohexane, α, α-bis-(4hydroxphenyl) -p-diisopropylbenezene, 2,2-bis-(3-chloro-4-hydroxyphenyl)-propane, hydroxybenzophenone and 4,4'-sulfonyl disphenyl.

The most preferred dihydroxy compound is 2,2-bis-(4-hydroxphenyl)-propane (bisphenol A).

The polycarbonates of the invention may entail in their structure, units derived from one or more of the suitable dihydroxy compounds.

The preparation of polycarbonate resins may be carried out in accordance with any of the processes known in the art, for example, by the interfacial polycondensation process, polycondensation in a homogeneous phase or by transesterification. The suitable processes and the associated reactants, catalysts, solvents and conditions are known in the art and have been described in German Pat. Nos. 1,146,311 and 962,274 and in U.S. Pat. Nos. 3,248,414; 3,153,008; 3,215,668; 3,187,065; 3,028,365; 2,999,846 2,999,835; 2,964,974; 2,970,137; 3,912,638 and 1,991,273, all incorparated herein by reference.

In the preparation of the polycarbonate resins of the invention, monofunctional reactants such as monophenols may be used in order to limit their respective molecular weights. Also, branching agents may be employed. Branching may be obtained by the incorporation of small amounts, preferably of between about 0.05 and 2.0 % (relative to diphenols employed), of trifunctional or more than trifunctional compounds, especially compounds having three or more aromatic hydroxyl groups. Polycarbonates of this type are described, for example, in German Offenlegungsschriften (German Published Specifications) Nos. 1,570,533; 1,595,762; 2,116,974 and 2,113,347British Specifications No. 1,179,821 and U.S. Pat. No. 3,544,514 (incorporated herein by reference).

Some examples of compounds with three or more than three aromatic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl) -heptane, 1,4,5-tri-(4-hydroxyphenyl)-benzene, 1,1,1-tri-(4-hydroxyphenyl)-ethane, tri-(4-hydroxyphenyl), -cyclohexyl)-propane, 2,4-bis-(4-hydroxyphenyl-isopropyl)-phenol, 2,6bis-(2-hydroxy-5'-methylbenzyl)-4-methylphenol, 2-(4-hydroxyphenyl)-2-(2,4-dihydroxy-phenyl)-propane, hexa-(4-(4-hydroxyphenylisopropyl)-phenyl)-orthoterephalic acid ester, tetra-4-hydroxy-phenyl)-methane, tetra-(4-hydroxyphenylisopropyl)-phenoxy)-methane and 1,4-bis-(4', 4'''-dihydroxytri-phenyl)-methyl-benzene. Some of the other trifunctional compounds are 2,4-dihydroxy-benzoic acid, trimesic acid, cyanuric acid and 3,3bis-(4-hydroxyphenyl)-2-oxo-2,3dihydroindole.

The polyalkylene terephthalate resins, which are suitable in the present context are known. The preferred species, polyethylene terephthalate (PET) and polybutylene terephthalate (PBT) are available in commerce. Processes for their preparation are known and have been described in, among others, U.S. Pat. Nos. 2,465,319 and 3,047,539, both incorporated hwerein by reference.

Aromatic polyesters and polyester-carbonates are known in the art. These have been described in the following documents, all of which are incorporated herein by reference. U.S. Pat. Nos. 4,252,939; 4,260,731; 4,360,648; 4,338,422; 4,369,303; 3,030,331; 3,169,121; 3,110,698; 4,130,548; 4,240,968 and 4,330,662. Also incorporated by reference in this connection are German Pat. Nos. 2,232,877; 1,495,626; 1,495,302; 2,753,230; 3,016,020; French Pat. No. 1,492,430; European Pat. Nos. 8492; 10840; 17740; 28353 and 50847; and the article "Synthesis of Poly(ester Carbonate) Copolymers", D. C. Prevorsek et al, Journal of Polymer Science: Polymer Chemistry Edition, Vol. 18, 75–90 (1980).

The blowing agent in the present context is characterized in that primary amine is among its thermal decomposition products; the amine is preferbly an aminourazole. Among the suitable agents, there are hydrazodicarboxylates which are noted for the great volume of gas evolution attendant upon their thermal decomposition. These hydrazodicarboxylates conform to

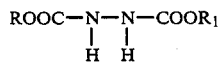

wherein R and $R_1$ independently denote a member selected from the group consisting of primary, secondary and tertiary straight-chain or branched-chain $C_1$-$C_8$alkyl $C_5$-$C_8$cycloalky, $C_6$-$C_{10}$aryl, $C_7$-$C_{10}$aralkyl and $C_1$-$C_{10}$alkaryl radicals. Preferred species have at least one of R and $R_1$ selected from the group consisting of isopropyl, secondary butyl and tertiary butyl and the other of R and $R_1$ is a $C_1$-$C_4$alkyl. Most preferred species are those wherein both R and $R_1$ are selected from the group consisting of isopropyl, secondary butyl and tertiary butyl. The foaming agent most suitable is diisopropylhydrazodicarboxylate;

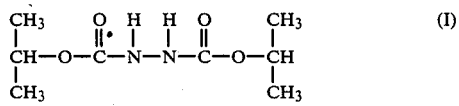

U.S. Pat. No. 3,888,801, which disclosure is incorporated herein by reference, contains further information respecting the hydrazodicarboxylates of the invention. The most suitable foaming agent may be prepared in accordance with the technique disclosed in U.S. Pat. No. 3,888,801. This agent is characterized in that its melting temperature is about 221°-224° F. and its decomposition temperature is about 520°-590° F. Upon its decomposition, it generates an amount of 4-aminourazole corresponding to about 15% of its original weight.

The concentrate of the invention may contain an amount of a nucleating agent sufficient to bring about a uiniform size distribution of the cells. Preferably, the amount of the nucleating agent is about 0.05 to 5% relative to the weight of the composition. The nucleating agents for structural foams are well known in the art and among them, mention may be made of glass fibers and milled glass.

In the practice of the invention, the chemical blowing agent (CBA) concentrate comprises a chemical blowing agent and a modifying agent and optionally, the resin component. Typically, the chemical blowing agent concentrate of the invention comprises at least 30% resin component, the balance being of the chemical blowing agent and the modifying agent. In a preferred embodiment the amount of the resin in the chemical blowing agent concentrate is 10 to 40% and the relative amounts of chemical blowing agents and modifying agent may vary but preferably range from 2.5 to 20% of the CBA and 30 to 90% of the modifying agent. In the practice of the invention, the chemical blowing agent concentrates are added to the resin to be foamed in an amount calculated to bring about a predetermined, desired amount of foaming. Typically the amount of CBA concentrate ranges from about 0.5 to about 5%, preferably 1 to 4% by weight relative to the weight of the resin.

The compositions of the knowing may contain further additives which are known in the art for their efficacy in the context oa foamable molding compositions. These include various reinforcing agents, fillers, pigments and dyes, plasticizers, UV and hydrolysis stablizers, flame retardants, drip suppressants and mold release agents. The mixing of the components may be carried out in a known manner utilizing known equipment. Preferably mixing may be carried out in an extruder.

EXPERIMENTAL

Several chemicals blowing agents CBA concentrates including an ambodiment of the present invention were prepared and their properties evaluated as summarized below. Table 1 describes the several concentrates in terms of their constituents. The noted amounts are in percent by weight.

TABLE 1

| | Chemical Blowing Agent Concentrates | | | | | |
|---|---|---|---|---|---|---|
| | A | B | C | D | E | F |
| Polycarbonate | 53.0 | 39.2 | 60.7 | 31.4 | 31.4 | 90.0 |
| S/MA Copolymer[1] | 30.0 | 40.8 | — | — | — | — |
| S/MA Copolymer[2] | 7.0 | — | — | — | — | — |
| Impact Modifier[3] | — | 10.0 | — | — | — | — |
| S/M/MM//ABS[4] | — | — | 29.3 | 58.5 | — | — |
| S/MA/MM//ABS[5] | — | — | — | — | 58.5 | — |
| Chemical Blowing Agent[6] | 10.0 | 10.0 | 10.0 | 10.0 | 10.0 | 10.0 |

[1] a copolymer of styrene/maleic anhydride containing 16% by weight of maleic anhydride;
[2] a copolymer of styrene/maleic anhydrides, mole ratio of styrene to maleic anhydride 1:1;
[3] an acrylate rubber based impact modifier, Paraloid EXL 2330 from Rohm and Haas;
[4] Styrene-maleic anhydride - methyl methacrylate terpolymer (weight ratio 69:25:6) blended with ABS. The content of the ABS was about 44%;
[5] same as 4 above except that ABS content was about 70%;
[6] Diisopropyl hydrazo-dicarboxylate.

The concentrates were prepared using a 30 mm twin screw compounding extruder at a melt temperature of about 245° C. which is below the decomposition temperature of the chemical blowing agent, using a conventional pelletizing technique.

Moldings in accordance with the present invention were prepared and their properties determined as summarized below. The pelletized concentrates were tumble blended with a polycarbonate base resin. The base resin — a homopolycarbonate of bisphenol A — contained 5 percent by weight of glass fibers and a small amount of a flame retarding agent, neither having criticality in the present context. The molding compositions, the properties of which are summarized in Table 2, contained 97.5% of the base resin and 2.5% of the noted chemical blowing agent concentrate.

TABLE 2

| Impact energy (ft. lbs.) | COMPOSITIONS CONTAINING CBA CONCENTRATE | | | | | |
|---|---|---|---|---|---|---|
| | A | B | C | D | E | F |
| Average | 34.0 | 36.6 | 47.6 | 53.0 | 51.5 | 38.8 |
| Std. Dev. | 12.3 | 8.4 | 2.7 | 1.0 | 9.0 | 6.0 |
| Relative Viscosity | 1.281 | 1.266 | 1.282 | 1.288 | 1.278 | 1.262 |

The compositions described in Table 2 were molded as foamed ¼- thick test plaques. The resin was not dried prior to processing — contrary to common practice — and thus contained about 0.13–0.15 percent water. After molding the parts were tested as to their impact strength — using an Instron instrumented impact testing device. Also, by measuring the relative viscosity of the resin which relates to a measure of the molecular weight of the resin, the level of resin degradation as a result of processing in accordance with the invention was determined. In accordance with the findings reported above, compositions of the invention represented by C, D, and E — show a greater level of resin stability as compared to Composition F (no modifying agent) and to compositions A and B which represent current practice. Thus, when wet, undried, resin is foam molded using the normally recommended amount of CBA concentrate, the composition of the invention shows less resin degradation than do resins which are foamed using conventional concentrates.

The data presented in Table 3 summarizes the evaluation of plaques molded from compositions which contain 5 percent of CBA concentrate. These compositions were dried (circulating air oven at 250° F. for 4 hours) and their moisture content was less than 0.02%.

TABLE 3

| Impact Energy (ft. lbs.) | COMPOSITIONS CONTAINING CBA CONCENTRATE | | | | | |
|---|---|---|---|---|---|---|
| | A | B | C | D | E | F |
| Average | 46.2 | 43.8 | 49.8 | 50.3 | 41.8 | 40.4 |
| Std. Dev. | 2.3 | 2.9 | 2.4 | 3.0 | 3.5 | 7.6 |
| Relative Viscosity | 1.268 | 1.281 | 1.282 | 1.280 | 1.283 | 1.273 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a thermoplastic polymeric resin selected from the group consisting of polycarbonate, polyalkylene therephthalate, aromatic polyester and polyester carbonate and a chemical blowing agent concentrate which includes a chemical blowing agent and a stabilizing amount of a modifying agent, said chemical blowing agent being characterized in that among its thermal decomposition products there is present a primary amine, said modifying agent being a mixture of (i) an anhydride polymer and (ii) a butadiene based rubber.

2. The composition of claim 1 wherein said blowing agent conforms to

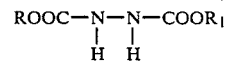

wherein R and $R_1$ independently denote a member selected from the group consisting of primary, secondary and tertiary straight-chain or branched-chain $C_1$–$C_8$ alkyl, $C_5$–$C_8$ cycloalkyl, $C_6$–$C_{10}$ aryl, $C_7$–$C_{10}$ aralkyl and $C_7$–$C_{10}$ alkaryl radicals.

3. The composition of claim 1 wherein anhydride polymer is a compound containing at least one cyclic anhydride.

4. The composition of claim 1 wherein said anhydride polymer contains at least one maleic acid anhydride.

5. The complsition of claim 4 wherein said anhydride polymer is a copolymer of maleic acid anhydride and at least one olefin.

6. The composition of claim 1 wherein said anhydride conforms to

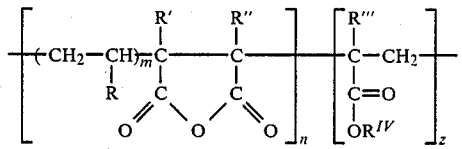

wherein
is a hydrogen atom or a substituted or an unsubstituted radical selected from the group consisting of $C_6$–$C_{12}$ alkoxy and $C_1$–$C_{28}$ alkyl radicals,
is an integer of from 1 to about 200,
is about 1 to 5, z is 0 to 5 and
$R'$ and $R''$ independently are a hydrogen or a halogen atom or a $C_1$–$C_3$ alkyl radical, $R'''$ is a hydrogen atom or a $C_1$–$C_4$ alkyl radical and $R^{IV}$ is a linear or branched $C_1$–$C_{30}$ alkyl or an arylaldyl radical.

7. The composition of claim 1 wherein said rubber is an ABS resin.

8. In the process of foam molding an article from a thermoplastic composition comprising a resin selected from the group consisting of polycarbonate, polyalkylene terephthalate, aromatic polyester and polyester carbonate which is characterized in its tendency towards structural degradation upon exposure to primary amines at the molding temperature of the resin, the improvement comprising using in said process of foam molding a chemical blowing agent concentrate which includes a chemical blowing agent and a stabilizing amount of a modifying agent, said chemical blowing agent being characterized in that among its thermal decomposition products, there is present a primary amine, said modifying agent being a mixture of (1) an anhydride polymer and (2) a butadiene based rubber.

* * * * *